United States Patent [19]

Schimmel et al.

[11] Patent Number: 4,835,848

[45] Date of Patent: Jun. 6, 1989

[54] APPARATUS FOR FEEDING RIGID SPACERS INTO TRAVELLERS FOR A VERTICAL BLIND

[75] Inventors: Petrus J. C. Schimmel, Delft; Gerhardus J. Spikker, Haaksbergen, both of Netherlands

[73] Assignee: Hunter Douglas International N.V., Curacao, Netherlands Antilles

[21] Appl. No.: 160,549

[22] Filed: Feb. 25, 1988

[30] Foreign Application Priority Data

Feb. 27, 1987 [GB] United Kingdom ................. 8704649

[51] Int. Cl.[4] ............................................. B23P 19/04

[52] U.S. Cl. ....................................... 29/24.5; 29/771; 29/786; 29/790; 29/809; 29/810; 29/823

[58] Field of Search ................. 29/809, 810, 822, 823, 29/24.5, 429, 430, 467, 771, 779, 782, 786, 790

[56] References Cited

U.S. PATENT DOCUMENTS

| | | | |
|---|---|---|---|
| 2,917,810 | 12/1959 | Wilson | 29/24.5 |
| 3,281,914 | 11/1966 | Hunter et al. | 29/24.5 |
| 3,824,657 | 7/1974 | Nilsson | 29/24.5 |
| 4,538,330 | 9/1985 | Edixhoven | 29/24.5 |
| 4,607,419 | 8/1986 | Köhler et al. | 29/24.5 |

*Primary Examiner*—Joseph M. Gorski
*Attorney, Agent, or Firm*—Pennie & Edmonds

[57] ABSTRACT

Apparatus for feeding a plurality of rigid steel elongate spacers into each of a plurality of travellers 22, the apparatus including the holding station 16, a retractable holding member 24, 25 which can be used to feed a single traveller into the holding station. A linear guide 30 is provided for guiding the spacers 62 to the holding station in a lengthwise direction and the first feed mechanism 32 is provided for feeding the spacers individually and separately along the guide to position with the leading edge of the spacer adjacent the holding station. A second feed mechanism 40 to 46 pushes a spacer 62 so positioned positively into and through a co-operating slot in the traveller 22 held in the holding station and a discharge member 68 discharges the traveller and its associated spacer from the holding station, when the holding member has been retracted.

8 Claims, 3 Drawing Sheets

APPARATUS FOR FEEDING RIGID SPACERS INTO TRAVELLERS FOR A VERTICAL BLIND

The present invention relates to apparatus for feeding a plurality of rigid, ferro-magnetic metallic elongate spacers, one into each of a plurality of travellers for a vertical blind.

Conventionally these travellers which move horizontally along a head rail are spaced from one another, often by the insertion of a steel strip. Thus each traveller has associated with it a strip which connects it to its neighbouring traveller, the strips all having the same length so that the travellers, and therefore the vertical louvres, are spaced from one another by an equal amount. The end travellers have one strip inserted and the intermediate slats have two strips. Conventionally, the spacer strips are fed manually into the travellers and this is a very delicate and time consuming operation which can also damage the fingers of the operator. It would therefore be advantageous to have this insertion done by a simple automatic system and this has not yet been achieved.

However, according to the present invention, there is provided apparatus for feeding a plurality of rigid, ferro-magnetic metallic, elongate prefabricated spacers, one into each of a plurality of travellers for a vertical blind, said apparatus comprising a holding station, a retractable holding member in said station, means for feeding a single traveller into said holding station to be retained by said holding member, a linear guide for guiding said elongate spacers to said holding station in a lengthwise direction, a first feed mechanism for feeding said spacers individually and separately along said guide to a position with the leading edge of the spacer adjacent said holding station, a second feed mechanism for pushing a spacer, so positioned, positively into and through a co-operating slot in a traveller held in said holding station by said holding member and a discharge member for discharging a traveller and its associated spacer from said holding station, when said holding member has been retracted, in a direction parallel to the length of the associated spacer and away from said guide.

Such an apparatus can feed the ferro-magnetic metallic elongate spacers one into each of the plurality of travellers for a vertical blind in a fully automatic manner without there being any real need for manual intervention other than providing supervision of the operation.

The first feed mechanism preferably includes a plurality of magnetic rollers rotatable about axes perpendicular to the linear guide and spaced therealong. These magnetic rollers can cause the ferro-magnetic metallic elongate spacers to be taken up and moved accurately forwardly by the correct amount, to a position in which the leading edge of the leading spacer is immediately adjacent the holding station and a traveller positioned therein. The second feed mechanism which may, for example, comprise a fluid pressure operated piston and cylinder arrangement carrying a pusher finger movable along the guide by operation of the piston and cylinder arrangement, can then cause the spacer to be forced into the housing so that it passes through the co-operating slot in the traveller housing. Advantageously the finger is pivotally mounted on the piston rod of the fluid pressure operated piston cylinder arrangement so that when the piston is retracted, it can then take up a position to operate on a subsequent spacer, the finger can pivot upwardly and readily pass over the next spacer which by this time will have been located close to the holding station.

The means for feeding travellers advantageously comprise a system for feeding travellers transversely to the longitudinal direction of the linear guide and equally the holding member is preferably retracted by movement in a direction transverse to the longitudinal direction of the linear guide. Indeed, in a preferred construction the holding member itself actually forms the means for feeding the travellers to the holding station.

Desirably the discharge member comprises a further fluid pressure operated piston and cylinder arrangement which is mounted adjacent and substantially parallel to the linear guide and this can co-operate with the discharge guide positioned to receive several of the travellers and associated spacers as they are moved by the discharge member from the holding station.

Preferably a magnetic catcher element is positioned adjacent the holding station to catch the free end of the spacer after it has been pushed through the associated slot of a traveller, releasing said spacer as the associated traveller is discharged from the holding station.

In order that the present invention may more readily be understood, the following description is given, merely by way of example, reference being made to the accompanying drawings in which.

Figure 1:
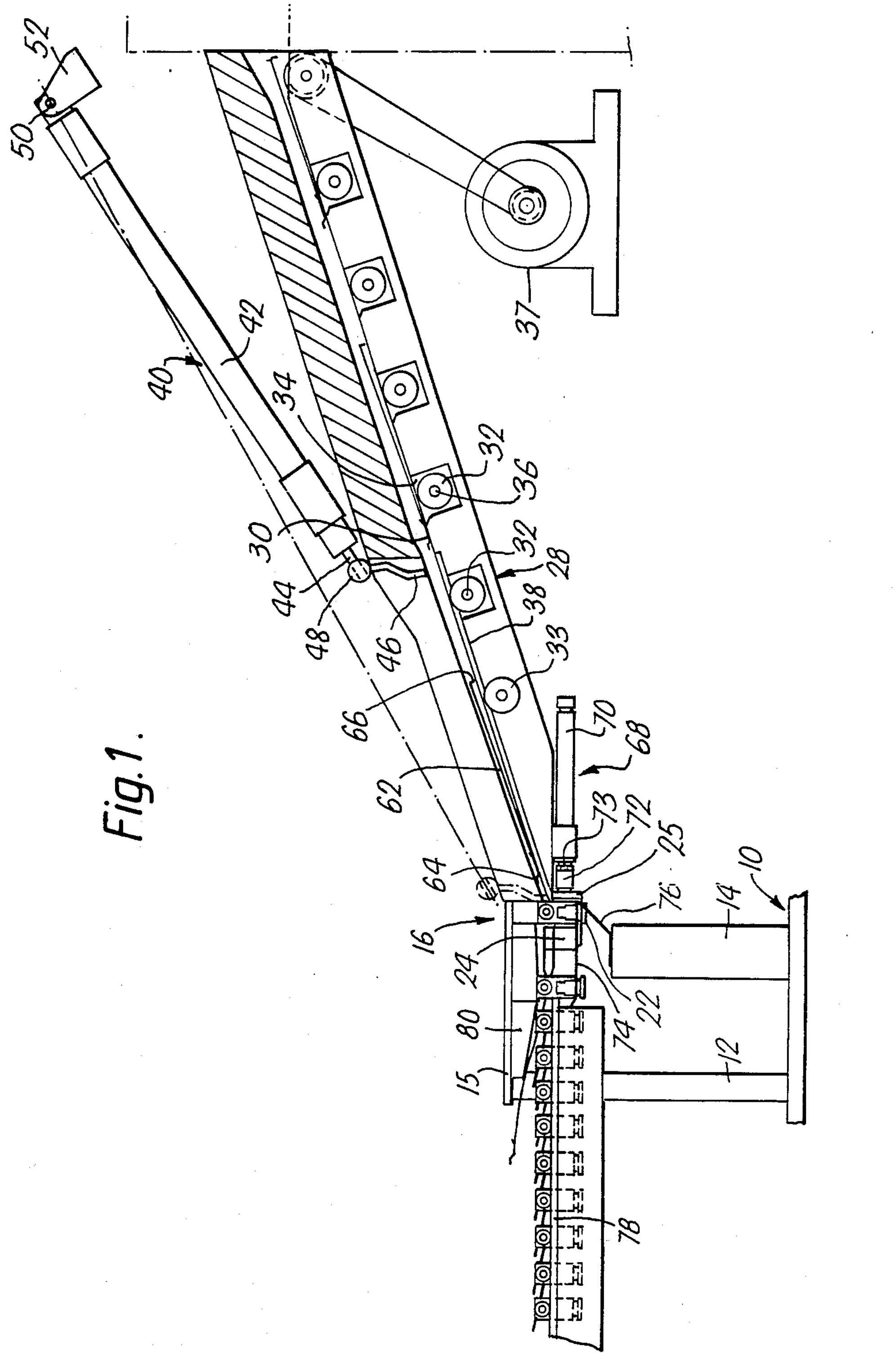
FIG. 1 is a schematic side elevation of one embodiment of apparatus according to the invention.

Referring first to FIG. 1 the apparatus illustrated includes a base 10 carrying first and second support pillars 12 and 14. The first support pillar carries a horizontal frame 15 which supports a holding station 16.

Figure 2:
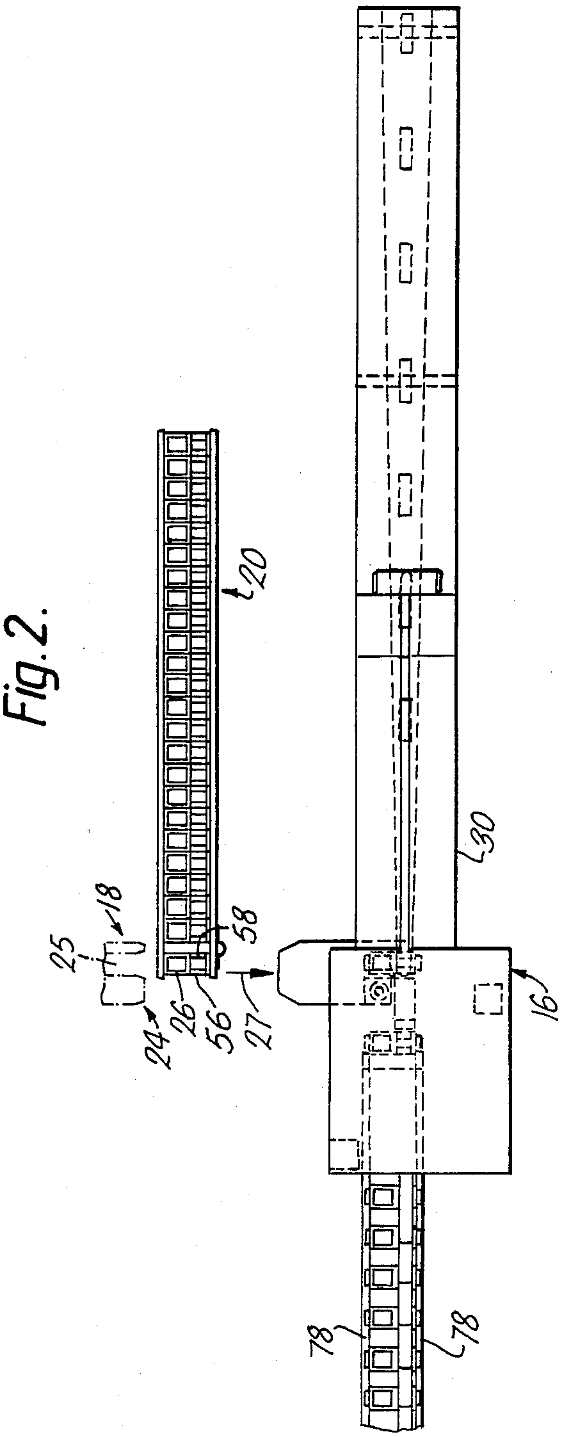
FIG. 2 is a plan of the apparatus of FIG. 1.

If reference is now made to FIG. 2 it will be seen that feeding means indicated by the general reference numeral 18 include a magazine 20 carrying several traveler housings 22 which are urged to the left by means, such as a spring, pneumatic cylinder or the like (not shown). A reciprocable fork 24 includes a retractable holding member 25 which is movable to engage an end traveller housing 26 at the left end of the magazine 20, as seen in FIG. 2, and move this along a transverse axis 27 into the holding station 16. The fork can also be operated by a pneumatic piston and cylinder arrangement (not shown).

A first feed mechanism 28 (see FIG. 1) includes a linear guide in the form of a ramp 30 associated with which are several magnetic rollers 32 positioned in recesses 34 and mounted for rotation about horizontal axes 36. The rollers 32 can be rotated in a counterclockwise direction by a motor 37 and an associated chain system not illustrated in detail.

The lower end of the ramp 30 includes a groove 38 into which the lowermost roller 32 and a non-magnetic further roller 33 project.

The second feed mechanism 40 includes a pneumatic cylinder 42 having a piston, a piston rod 44 of which carries a pusher finger 46 via a pivotal connection 48 which allows the finger to pivot from the position shown in a clockwise direction to a limited extent about a horizontal axis. At its rear end a pneumatic cylinder 42 is mounted via a horizontal axis pivot 50 on a bracket 52.

Figure 3:
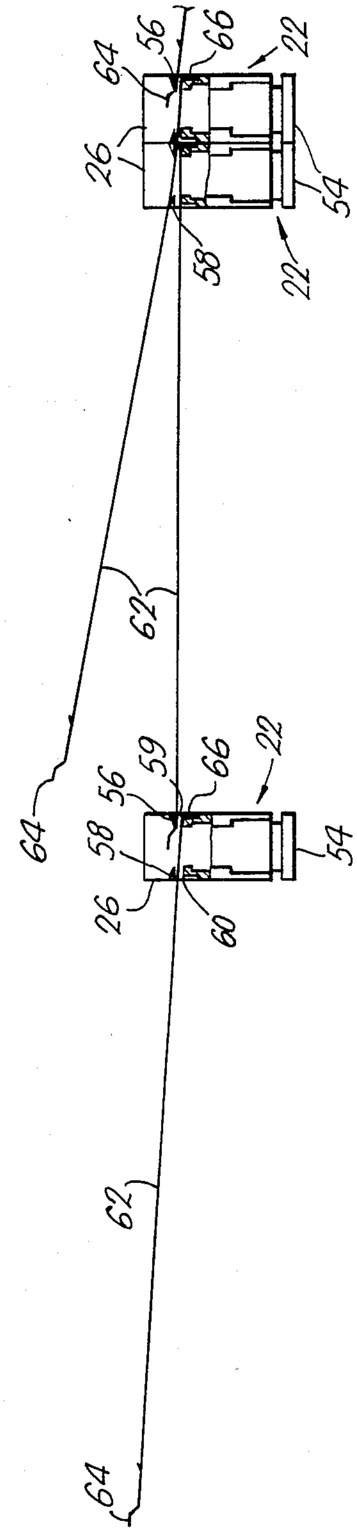
FIG. 3 is a schematic view of a number of housings with the elongate spacers inserted into the slots thereof.

If reference is made to FIGS. 1 and 3, it will be seen that each traveller housing 22 is provided with a pair of guide rollers 54 and the upper zone of the housing includes a first bridge 56 and a second bridge 58 under which are formed slots 59 and 60. Into these slots 59, 60 is inserted a spacer 62 having an upturned leading end 64 and a downturned rear stop 66. Each spacer is prefabricated to the exact length required. It is this arrangement that the apparatus of the present invention is designed to assemble.

Mounted below the ramp 30, at the lower end thereof, is a discharge member 68 having a horizontal axis ending in the same plane as the axis of the ramp 30 and the second feed mechanism cylinder 42. Associated with the pneumatic cylinder 70 is a discharge head 72 mounted on the piston rod 73 of the cylinder 70. Located to the left of the pusher head 72 is a guide rail 74 carried on a guide rail support 76 mounted on the second support pillar 14. Aligned with the axis of the pneumatic cylinder are a pair of spaced discharge guides 78, spaced apart from one another by a distance so that the guide rollers 54 of the traveller housing 22 can run along these guide rails 78. A magnetic catcher element 80 is mounted below the frame 15 adjacent the holding station 16.

In operation of the above described apparatus, a supply of traveller housings 22 are mounted in the magazine 20 and urged to the left by the means not shown. The feed mechanism 18 is then operated so that the end housing 26 is accommodated in the holding member 25 and continued movement of the fork 24 along the axis 27 urges the housing into the holding station, that is to say so that it lies in the vertical plane including the axes of the discharge member 68, of the first feed mechanism 28 and the second feed mechanism 40.

With the traveller housing so positioned, the lowermost spacer 62 is positioned with its leading edge 64 adjacent the thus positioned traveller housing. This is achieved by the spacer being forced downwardly by the magnetic rollers 32 translating these spacers themselves in spaced relation towards the bottom. Having left the lowermost magnetic roller 32, continued movement of the spacer is assisted by the non-magnetic roller 33.

The second feed mechanism 42 is then actuated and the pusher finger 46 engages the downturned rear stop 66 of this lowermost spacer and continued operation of the cylinder causes the finger to push the leading edge 64 of the spacer into the slot 59 under the first bridge 56 and then into the slot 60 under the second bridge 58. The spacer is then guided through guiding fork 24 to the preceding traveller housing. The spacer is pushed into slot 59 under the first bridge 56 of said proceeding traveller housing and over the second bridge 58.

After this, fork 24 is retracted and the discharge cylinder 70 is actuated and the discharge head 72 pushes the housing 22 and its associated spacer to the left along the guide rails 74. The magnetic catcher 80 catches the leading edge of the inserted spacer.

The operation is then repeated as many times as is necessary an each time the discharge cylinder is operated the housings are pushed to the left so that their rollers 54 move along the guide rail 78. The leading edge of the second and subsequent spacers 62 is pivoted under the first bridge 56 of the previous housing, above the spacer already inserted therein, and then over the second bridge 58, before being caught by the magnetic catcher 80, which prevents this from becoming entangled with the previously assembled traveller housings and spacers. The housings are shown slightly spaced from one another for the sake of clarity. In practice they would be rather closer together as they are discharged along the rail 78. The operation is stopped when the desired number of travellers and spacers have been assembled to form sufficient for a given blind. The operation is then recommenced when the travellers for a new blind are to be assembled.

What we claim is:

1. Apparatus for feeding a plurality of rigid, ferromagnetic metallic, elongate prefabricated spacers, one into each of a plurality of travellers for a vertical blind, said apparatus comprising a holding station, a retractable holding member in said station, means for feeding a single traveller into said holding station to be retained by said holding member, a linear guide means for guiding said elongate spacers to said holding station in a lengthwise direction, a first feed means for feeding said spacers individually and separately along said guide means to a position with the leading edge of a spacer adjacent said holding station, a second feed means for pushing a spacer, so positioned, positively into and through a co-operating slot in a traveler held in said holding station by said holding member, and a discharge means for discharging a traveller and its associated spacer from said holding station, when said holding member has been retracted, in a direction parallel to the length of the associated spacer and away from said guide means.

2. Apparatus as claimed in claim 1, wherein said first feed means includes a plurality of magnetic rollers rotatable about axes perpendicular to said linear guide means and spaced therealong.

3. Apparatus as claimed in claim 1, wherein said second feed means comprises a fluid pressure operated piston and cylinder means carrying a pusher finger movable along said guide means by operation of said piston and cylinder means.

4. Apparatus as claimed in claim 1, wherein said means for feeding travellers comprise a system for feeding travellers transversely to the longitudinal direction of the linear guide means.

5. Apparatus as claimed in claim 1, wherein said holding member is retractable by movement in a direction transverse to the longitudinal direction of said linear guide means.

6. Apparatus as claimed in claim 1, wherein said discharge means comprises a fluid pressure operated piston and cylinder means mounted adjacent and substantially parallel to said linear guide means.

7. Apparatus as claimed in claim 1, and further comprising a discharge guide positioned to receive several of the travellers and associated spacers as they are moved by said discharge member from said holding station.

8. Apparatus as claimed in claim 1, and further comprising a magnetic element positioned adjacent said holding station to catch the free end of a spacer after it has been pushed through the associated slot of a traveller, but releasing said spacer as the associated traveller is discharged from the holding station.

* * * * *

UNITED STATES PATENT AND TRADEMARK OFFICE
CERTIFICATE OF CORRECTION

PATENT NO. : 4,835,848

DATED : June 6, 1989

INVENTOR(S) : Petrus J.C. Schimmel et al.

It is certified that error appears in the above-identified patent and that said Letters Patent is hereby corrected as shown below:

Figure 1, the element above "78", i.e. the little circle within the larger circle should be labelled as --54--.

Figure 2, the elements corresponding to "54" above should be labelled as --54--.

Figure 3, delete "54" on both occurrence.

Signed and Sealed this

Twenty-ninth Day of May, 1990

*Attest:*

HARRY F. MANBECK, JR.

*Attesting Officer*

*Commissioner of Patents and Trademarks*